United States Patent [19]

Tsao et al.

[11] Patent Number: 4,929,576
[45] Date of Patent: May 29, 1990

[54] REACTIVATING CATALYSTS CONTAINING NOBLE METALS ON MOLECULAR SIEVES CONTAINING OXIDES OF ALUMINUM AND PHOSPHORUS

[75] Inventors: Ying-Yen P. Tsao, Lahaska, Pa.; Roland von Ballmoos, Hopewell, N.J.

[73] Assignee: Mobil Oil Corporation, New York, N.Y.

[21] Appl. No.: 323,178

[22] Filed: Mar. 15, 1989

Related U.S. Application Data

[63] Continuation-in-part of Ser. No. 140,358, Jan. 4, 1988, abandoned.

[51] Int. Cl.$^5$ .................... B01J 29/38; B01J 23/94; B01J 38/42
[52] U.S. Cl. .......................................... 502/35; 502/37
[58] Field of Search ..................... 502/35, 37

[56] References Cited

U.S. PATENT DOCUMENTS

| | | | |
|---|---|---|---|
| 2,906,702 | 9/1959 | Brennan et al. | 208/140 |
| 3,134,732 | 5/1964 | Kearby | 502/35 |
| 3,692,692 | 9/1972 | Ward et al. | 252/412 |
| 3,849,293 | 11/1974 | Ward | 502/35 |
| 3,937,660 | 2/1976 | Yates et al. | 502/35 |
| 3,943,051 | 3/1976 | Ward | 208/111 |
| 3,943,052 | 3/1976 | Kmak et al. | 502/37 |
| 3,986,982 | 10/1976 | Aronson et al. | 502/35 |
| 4,107,031 | 8/1978 | Ward | 208/111 |
| 4,139,433 | 2/1979 | Ward | 208/111 |
| 4,310,440 | 1/1982 | Wilson et al. | 252/435 |
| 4,419,220 | 12/1983 | LaPierre et al. | 208/111 |
| 4,440,871 | 4/1984 | Lok et al. | 502/214 |
| 4,447,551 | 5/1984 | Faney et al. | 502/35 |
| 4,473,657 | 9/1984 | Tse et al. | 502/35 |
| 4,500,651 | 2/1985 | Lok et al. | 502/208 |
| 4,518,708 | 5/1985 | Krishnamurthy et al. | 502/37 |
| 4,554,143 | 11/1985 | Messina et al. | 423/306 |
| 4,567,029 | 1/1986 | Wilson et al. | 423/306 |
| 4,645,750 | 2/1987 | Best | 502/26 |
| 4,645,751 | 2/1987 | McCullen et al. | 502/35 |
| 4,657,874 | 4/1987 | Borghard et al. | 502/35 |
| 4,686,093 | 8/1987 | Flanigen et al. | 423/306 |
| 4,689,138 | 8/1987 | Miller | 208/111 |
| 4,689,312 | 8/1987 | Ngocle et al. | 502/38 |
| 4,701,562 | 10/1987 | Olson | 568/390 |
| 4,704,478 | 11/1987 | Olson | 568/388 |

FOREIGN PATENT DOCUMENTS 167797  5/1954  Australia ............................ 585/37

OTHER PUBLICATIONS

WO86/03139, Jun. 5, 1986, U.S. translation.

*Primary Examiner*—Asok Pal
*Attorney, Agent, or Firm*—A. J. McKillop; C. J. Speciale; E. F. Kenehan, Jr.

[57] ABSTRACT

There is provided a process for redispersing agglomerated noble metals such as platinum over the surface of certain tetrahedral crystalline oxides containing oxides of aluminum and phosphorus. Examples of such crystalline oxides include aluminophosphate (i.e. AlPO$_4$s), silicoaluminophosphates (i.e. SAPOs), ELAPSOs, MeAPOs, FeAPOs, TiAPOs and FCAPOs. The agglomerated noble metals may be redispersed by containing the supported noble metal with a suitable treating agent such as a stream of gas comprising molecular chlorine.

20 Claims, No Drawings

REACTIVATING CATALYSTS CONTAINING NOBLE METALS ON MOLECULAR SIEVES CONTAINING OXIDES OF ALUMINUM AND PHOSPHORUS

This is a continuation of copending application Ser. No. 140,358, filed on January 4, 1988, now abandoned.

BACKGROUND

This application relates to a process for reactivating catalysts having noble metals, such as platinum, supported on microporous crystalline oxide materials containing aluminum and phosphorus.

Noble metals are known to have catalytic activity in converting organic compounds. For example, such metals may be used in the hydrogenation and dehydrogenation of hydrocarbons. It will be noted that noble metals, such as platinum, are extremely expensive and rare. Accordingly, when these materials are used as catalysts they are generally uniformly distributed on a suitable support material. In this regard, the noble metal should be as finely dispersed as possible in order to provide a maximum surface area for contact with reactant molecules.

A number of materials have been used to support noble metal catalysts. These materials may be either essentially catalytically inactive or also possess catalytic properties which function in an additive or synergistic fashion with the catalytic properties of the noble metal. An example of an essentially catalytically inactive support material is gamma-alumina. An example of a catalytically active support material is an acidic aluminosilicate zeolite. Such zeolites have acid catalytic activity which may be used for a variety of organic compound conversions such as the cracking of hydrocarbons. Accordingly, a noble metal suitable supported on an appropriate zeolite may provide an excellent hydrocracking catalyst, wherein acid sites on the zeolite promote the cracking of hydrocarbons and the noble metal, in close proximity to these acid sites, promotes the hydrogenation of the cracked products.

Zeolites, in addition to providing further catalytic activity, may provide a means for achieving shape selectivity for reactions catalyzed by noble metals. More particularly, such zeolites may have a porous network of channels which are large enough to freely permit entry of molecules of small diameter, such as straight chain paraffins, while tending to restrict molecules of larger diameter, such as aromatics or branched aliphatics. When noble metals are incorporated in the channels of such a zeolite, an isomerization catalyst for dewaxing hydrocarbons may be provided, wherein straight chain wax molecules are preferentially admitted into the channels and are converted to branched hydrocarbons under the influence of noble metal catalytic species. Note U.S. Pat. No. 4,419,220, the entire disclosure of which is expressly incorporated herein by reference.

When solid support or catalytic materials are exposed to hydrocarbons at elevated temperatures for prolonged periods of time, a dense hydrocarbonaceous deposit (e.g., coke) can tend to form on the solid materials. This coking process can deactrivate catalytic materials. One way of removing coke from deactivated catalysts is to oxidize (e.g., burn) the hydrocarbonaceous deposits by exposing the catalyst to a source of oxygen (e.g., air) at an elevated temperature. However, the severe conditions encountered in such oxidations can have a detrimental effect on certain supported noble metal catalysts. More particularly, as pointed out in U.S. Pat. No. 4,657,874, the entire disclosure of which is expressly incorporated herein by reference, when highly siliceous noble metal-containing zeolites are subjected to coke-burnoff, the noble metal thereof agglomerates, thereby substantially reducing the surface area of the noble metal. Note particularly, Example 5 of U.S. Pat. No. 4,657,874. The agglomerated noble metal on the zeolite can be redispersed by certain chemical treatments, but, as pointed out in this Example 5, this redispersion falls short of achieving the original level of high dispersion of noble metal before agglomeration.

The nature of the support material can have a profound effect on the manner in which noble metals can be distributed thereon under various conditions. As mentioned hereinabove, noble metals can be very finely distributed on highly siliceous zeolites. However, when subjected to the conditions of coke burn-off, this distribution is disturbed and agglomerates of noble metals form. The noble metal in these agglomerates can be only partially redistributed on the surface of the highly siliceous zeolites. In contrast to the surface of highly siliceous zeolites, the surface of gamma-alumina tends to more tenaceously hold noble metals. More particularly, noble metal supported on gamma-alumina will tend to agglomerate to a much less extend when such materials are subjected to the conditions of coke burn-off. The ability of a support material to inhibit the agglomeration of noble metals thereon and to promote the redispersion of noble metals thereon is apparently a function of the surface chemistry of the support material, e.g., in terms of the charge and charge distribution thereon.

Examples of materials which have an entirely different surface chemistry than highly siliceous zeolites are three-dimensional microporous crystal framework structures consisting essentially of corner-sharing oxide tetrahedra of alumina and phosphorus. An example of such a material is termed an aluminophosphate in U.S. Pat. Nos. 4,310,440 and 4,385,994, the entire disclosures of which are expressly incorporated herein by reference. The aluminum/phosphorus atomic ratio of these aluminophosphate materials is about unity, the framework positive charge on phosphorus being balanced by corresponding negative charge on aluminum:

$$AlPO_4 = (AlO^-_2)(PO^+_2).$$

Other materials which consist essentially of corner-sharing oxide tetrahedra of aluminum and phosphorus are those wherein minor portions of such tetrahedra are replaced by oxide tetrahedra of other elements. An example of such a material is a silicophosphoaluminate (i.e. SAPO) as described in U.S. Pat. No. 4,440,871, the entire disclosure of which is expressly incorporated herein by reference. Other examples of such materials containing tetrahedral oxides of aluminum and phosphorus are termed ELAPSOs, MeAPOs, FeAPOs, TiAPOs and FCAPOs, which are described in PCT International Publication No. WO 86/03139, the entire disclosure of which is also expressly incorporated herein by reference.

Prior to the time of the present invention, it was uncertain whether or not noble metals would tend to agglomerate after being dispersed on crystalline aluminum and phosphorus oxide containing materials such as aluminophosphates, SAPOs and ELAPSOs. More particularly, when subjected to the conditions of coke burn-off, it was uncertain whether such materials would behave as noble metals supported on highly siliceous zeolites, whereby the noble metals would become extensively agglomerated, or whether such materials would behave as noble metals supported on gamma-alumina, whereby the noble metals would resist extensive agglomeration and remain essentially dispersed. Surprisingly, it was discovered that noble metals became extensively agglomerated on these aluminum/phosphorus oxide supports.

Once the noble metal agglomerates were formed, it was further uncertain whether the noble metal agglomerates could be redispersed. There was certainly no reason to expect that noble metal agglomerates could be redispersed to a greater extent than observed for such redispersion on highly siliceous zeolites. However, it was surprisingly discovered that these agglomerates were redispersed on the aluminum/phosphorus oxides to a much greater extent than observed for the highly siliceous zeolite supports. Quite unexpectedly, the original extensive level of noble metal dispersion was observed after the redispersion treatment of the noble metal supported on the aluminum/phosphorus oxides.

SUMMARY

In accordance with one aspect of the invention, there is provided a process for repeated use of a catalyst, wherein the catalyst becomes deactivated and is subsequently regenerated and returned to use, said catalyst comprising a crystalline aluminum and phosphorus oxide-containing material, said crystalline material having a three-dimensional microporous crystal framework of corner-sharing oxide tetrahedra of the emperical formula:

$$(M_xAl_yP_z)O_2$$

where x is from 0 to 0.5, y is from 0.1 to 0.9 and z is from 0.1 to 0.9, wherein $x+y+z=1$, and where M represents at least one element other than Al or P capable of forming said three-dimensional oxide framework, said crystalline material containing a catalytically active form of at least one noble metal on the available surface area thereof, said process comprising the steps of:

(i) utilizing said catalyst in the catalytic conversion of organic compounds, whereby said catalyst is contacted with hydrocarbons, a hydrocarbonaceous deposit is formed on said catalyst and the catalytic activity of said catalyst is reduced;

(ii) subjecting the deactivated catalyst of step (i) to a source of oxygen at elevated temperature, whereby at least some of said hydrocarbonaceous deposit is oxidized and removed from said catalyst, noble metal in said catalyst having become agglomerated;

(iii) redispersing the agglomerated noble metal by contacting said catalyst with one or more substances capable of interacting with said noble metal, whereby noble metal is separated from the agglomerated masses thereof and redeposited on other surfaces of said crystalline material; and (iv) returning said regenerated catalyst of step (iv) to use in said conversion of organic compounds.

According to another aspect of the invention, there is provided a process for rejuvenating a deactivated noble metal-containing molecular sieve catalyst, said molecular sieve being a crystalline aluminum and phosphorus oxide-containing material having a three-dimensional microporous crystal framework of corner-sharing oxide tetrahedra of the emprical formula:

$$(M_xAl_yP_z)O_2$$

where x is from 0 to 0.5, y is from 0.1 to 0.9 and z is from 0.1 to 0.9, wherein $x+y+z=1$, and where M represents at least one element other than Al or P capable of forming said three-dimensional oxide framework, said deactivated catalyst containing agglomerated noble metal, said process comprising the steps of:

(i) dispersing said agglomerated metal associated with the deactivated catalyst by contacting said catalyst with a stream of gas containing a sufficient amount of molecular chlorine under conditions and for a period of time sufficient to achieve dispersion of the noble metal;

(ii) subsequently purging said catalyst with a purging gas; and (iii) reducing said purged catalyst in the presence of dry hydrogen at an elevated temperature.

EMBODIMENTS

The microporosity of crystalline aluminum and phosphorus oxide-containing materials may be measured by the ability of these materials to reversibly sorb certain quantities of certain molecules. For example, these materials may have an intra-crystalline adsorption capacity for water at 4.6 torr and 24° C. of at least 3.5 weight percent, the adsorption of water being completely reversible while retaining the same essential framework topology in both the hydrated and dehydrated state. By the term "essential framework topology" is meant the spatial arrangement of the primary M—O, Al—O and P—O bond linkages. No change in the framework topology indicates that there is no disruption of these primary bond linkages.

The crystalline oxide-containing material suitable for use in the present invention may consist of or consist essentially of oxides of aluminum and phosphorus. Additionally, this crystalline material may contain oxides of M, where M represents one or more elements capable of forming oxides other than Al or P. Accordingly, the crystalline oxide materials may be represented by the emperical formula $$(M_xAl_yP_z)O_2$$

where x is from 0 to 0.5 (e.g. from 0 to 0.3), y is from 0.1 to 0.9 (e.g. from 0.3 to 0.7) and z is from 0.1 to 0.9 (e.g. from 0.3 to 0.7), wherein $x+y+z=1$, and where M represents at least one element other than Al or P capable of forming the three-dimensional oxide framework of the crystalline material.

The element M may have a mean M—O distance in tetrahedral oxide structures between about 1.45 Angstroms and about 2.06 Angstroms. M is capable of forming stable M—O—P M—O—Al or M—O—M bonds in crystalline three dimensional oxide structures. Examples of M includes Si, B, Mg, Mn, Co, Zn, Fe, Ti, As, Be, Cr, Ga, Ge, Li, V and mixtures thereof.

Examples of crystalline oxide-containing materials suitable for use in the present invention include aluminophosphates (i.e. AlPO4s), silicoaluminophosphates (i.e. SAPOs), ELAPSOs, MeAPOs, FeAPOs, TiAPOs and FCAPOs. Aluminophosphates are described in the aforementinoed U.S. Pat. No. 4,310,440. Silicoaluminophosphates are described in the aforementioned U.S. Pat. No. 4,440,871. ELAPSOs are described in the aforementioned PCT International Publication No. Wo 86/03139, which claims priority to U.S. application Ser. No. 675,284, filed November 27, 1984, as well as in U.S. Pat. Nos. 4,704,478 and 4,701,562, the entire disclosures of which are expressly incorporated herein by reference. MeAPOs are described in U.S. Pat. No. 4,567,029, the entire disclosure of which is expressly incorporated herein by reference. FeAPOs are described in U.S. Pat. No. 4,554,143, the entire disclosure of which is expressly incorporated herein by reference. TAPOs are described in U.S. Pat. No. 4,500,651, the entire disclosure of which is expressly incorporated herein by reference. FCAPOs are described in U.S. Pat. No. 4,686,093, the entire disclosure of which is expressly incorporated herein by reference. Examples of ELAPSOs include CoAPSOs, FeAPSOs, MgAPSOs, MnAPSOs, TiAPSOs, ZnAPSOs, CoMgAPSOs, and CoMnMgAPSOs.

The crystalline oxide-containing material suitable for use in the present invention contains a catalytically active form of at least one noble metal on the surface area thereof. Examples of such noble metals include palladium, iridium, osmium, rhodium, ruthenium and, especially, platinum. These noble metals may be present in sufficient catalytic amounts. For example, the catalysts suitable for use in the present invention may contain from about 0.01 to about 10 percent by weight (e.g. from about 0.1 to about 3 percent by weight) platinum.

The noble metal may be impregnated or ion exchanged onto a pre-formed crystalline aluminum and phosphorus oxide-containing material. These ion exchange and impregnation techniques are well known in the art. Note U.S. Pat. Nos. 3,140,251; 3,140,252 and 3,140,253, the entire disclosures of which are expressly incorporated herein by reference. Alternatively, a suitable noble metal compound may be incorporated into the reaction mixture used to form the crystalline material. Such an alternative procedure is described in the Miller U.S. Pat. No. 4,689,138, the entire disclosure of which is expressly incorporated herein by reference.

In addition to crystalline oxide and noble metal, the catalyst suitable for use in the present invention may include a suitable binder or matrix material. In the case of many catalysts, it is desired to incorporate the oxide (e.g., silicophosphoaluminate) with another material resistant to the temperatures and other condition employed in organic conversion processes. Such materials include active and inactive material and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with an oxide (e.g., silicophosphoaluminate), i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the crystalline oxides include the montmorillonite and kaolin families which include the subbentonites, and the kaolins commonly known as Dixie, McNamee, Georgia and Florida clays or others in which the main mineral contituent is halloysite, kaolinite, dickite, nacrite, or anauxite. Such clays can be used in the raw sate as originally mined or initially subjected to calcination, acid treatment or chemical modification. Binders useful for compositing with the present crystal also include inorganic oxides, notably alumina or silica.

In addition to the foregoing materials, the oxide (e.g., silicophosphoaluminate) crystal can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline oxide (e.g., silicophosphoaluminate) material and inorganic oxide gel matrix vary widely, with the crystal content ranging from about 1 to about 90 percent by weight and more usually, particularly when the composite is prepared in the form of beads, in the range of about 2 to about 80 weight percent of the composite.

Catalysts suitable for use in the present invention, particularly those with acid catalytic activity (e.g. containing SAPOs), can be used in a variety of organic compound conversions. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 hr$^{-1}$ to about 20 hr$^{-1}$; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In general, therefore, catalytic conversion conditions over a catalyst comprising the oxide (e.g., silicophosphoaluminate) in active form include a temperature of from about 100° C. to about 760° C., a pressure of from about 0.1 atmosphere (bar) to about 200 atmospheres (bar), a weight hourly space velocity of from about 0.08 $hr^{-1}$ to about 2000 $hr^{-1}$ and a hydrogen/organic, e.g. hydrocarbon, compound of from 0 to about 100.

Particular examples of types of organic compound conversions include isomerization of alkylaromatics, isomerization dewaxing, hydrocracking, alkylation of aromatics, and disproportionation of aromatics. Isomerization dewaxing conversions are described in the aforementioned Miller U.S. Pat. No. 4,689,138. Also noted with regard to isomerization dewaxing are U.S. Pat. Nos. 4,689,312 and 4,419,220, the entire disclosures of which are expressly incorporated herein by reference.

Noble metal agglomerated on the oxide-containing crystalline material may be redispersed by treatments used to redisperse noble metal agglomerated on zeolites or amorphous supports. For example, the catalyst containing agglomerated noble metal may be contacted with a gas containing chlorine, fluorine, HCl or an organic chlorine containing material. Examples of such gas phase treatments are described in U.S. Pat. Nos. 3,986,982; 3,134,732 and 2,906,702, the entire disclosures of which are expressly incorporated herein by reference. The agglomerated noble metal may also be redispersed by contacting the catalyst with a liquid which comprises an aqueous solution of ammonium hydroxide or an ammonium salt. Examples of such liquid phase treatments are described in U.S. Pat. Nos. 4,139,433; 4,107,031; 3,943,051; 3,849,293 and 3,692,692, the entire disclosure of which are also expressly incorporated herein by reference. U.S. Pat. No. 4,645,750, the entire disclosure of which is expressly incorporated herein by reference, describes the redistribution of noble metal on a zeolite base by contacting the catalyst with an aqueous urea. A preferred treatment technique for redistributing agglomerated noble metal on the present crystalline support is described in the aforementioned U.S. Pat. No. 4,675,874.

After the agglomerated noble metal has been redispersed, it may be necessary to further treat the catalyst to convert it to the desired catalytically active form. For example, some or all of the noble metal may have become oxidized during the oxidation and/or redispersing steps. Accordingly, it may be desirable to contact the catalyst with hydrogen under conditions sufficient to reduce oxidized states of said noble metal to the elemental stage prior to returning the catalyst to catalytic use. For example, the catalyst may be reduced in a stream of hydrogen, optionally, dry hydrogen, at temperatures ranging from about 140° to about 550° C. Preferred reduction conditions include final temperatures ranging from about 200° to about 450° C., and pressures of from about 1 to about 40 atmospheres. Reduction time may be anywhere from about 1 to about 5 hours.

As mentioned previously, a preferred technique for redistributing agglomerated noble metal is described in U.S. Pat. No. 4,657,874. In accordance with this technique, the catalyst is contacted with a stream of gas containing molecular chlorine. The partial pressure of molecular chlorine in this stream of gas may be, e.g., from about 3 to about 15 Torr, e.g., from about 6 or 8 to about 12 Torr. The moisture content of the stream may be controlled so that the ratio of the partial pressure of water to the partial pressure of molecular chlorine is less than or equal to 2, e.g., greater than 0.01, e.g., less than or equal to 1.0, e.g., greater than or equal to 0.1. Where the moisture content of the stream is controlled in this manner, an unacceptable degree of leaching of iron in the form of gaseous iron chloride from the walls of an iron-containing reactor can be avoided.

The catalyst may be contacted with the molecular chlorine-containing gas stream at a temperature of, e.g., from about 150° C. to 450° C., e.g., from about 200° C. to about 400° C. This gas stream may optionally contain oxygen, e.g., at a partial pressure of from about 50 to about 500 Torr, e.g., from about 100 to about 400 Torr.

EXAMPLE

Platinum was dispersed on the surface of SAPO-5. For the purpose of comparison, platinum was also dispersed on the surface of zeolite beta. Samples of such Pt/SAPO-5 and Pt/beta catalysts were tested for Pt agglomeration and subsequent redispersion. The results are summarized in Table 1.

TABLE 1

Exposed Pt Surface Area of Molecular Sieve Catalysts With Respect to Treatments

| Catalyst | Pt Content | H/Pt Ratio (Pt Surface Area) | | |
|---|---|---|---|---|
| | | Fresh | Wet Air* Sintered | Wet Chlorine** Rejuvenated |
| Pt/SAPO-5 | 0.32% | 0.80→ | 0.29→ | 0.92 |
| | 0.56% | 1.18→ | 0.07→ | 1.16 |
| Pt/beta | 0.62% | 1.46→ | 0.18 | |
| Pt/Steamed beta | 0.65% | 1.30→ | 0.20→ | 0.26 |

*Sintering test was performed at 540° C. under wet air (15 torr water) for 16 hours.
**Rejuvenation was done at 450° C. for 4 hours under a gas mixture of 10 Torr chlorine, 10 Torr water, 380 Torr oxygen, and 360 Torr nitrogen.

What is claimed is:

1. A process for rejuvenating a deactivated noble metal-containing molecular sieve catalyst, said deactivated catalyst containing agglomerated platinum metal, said process comprising the steps of:
  (i) dispersing said agglomerated platinum associated with the deactivated catalyst by contacting said catalyst with a stream of gas containing a sufficient amount of molecular chlorine under conditions and for a period of time sufficient to achieve dispersion of the platinum metal;

(ii) subsequently purging said catalyst with a purging gas; and (iii) reducing said purged catalyst in the presence of dry hydrogen at an elevated temperature, wherein said catalyst comprises a crystalline aluminum and phosphorus oxide-containing material, said crystalline material having a three-dimensional microporous crystal framework of corner-sharing oxide tetrahedra of the emperical formula:

$$(M_xAl_yP_z)O_2$$

where x is from 0 to 0.5, y is from 0.1 to 0.9 and z is from 0.1 to 0.9, wherein $x+y+z=1$, and where M represents at least one element other than Al or P capable of forming said three-dimensional oxide framework, wherein M is selected from the group consisting of Si, Mg, Mn, Co, Zn, Fe, Ti, and mixtures thereof.

2. A process according to claim 1, wherein x is zero and said crystalline material is an aluminophosphate material.

3. A process according to claim 1, wherein x is greater than zero and said crystalline material is a silicoaluminophosphate material.

4. A process according to claim 1, wherein x is greater than zero and said crystalline material is selected from the group consisting of SAPOs, ELAPSOs, MeAPOs, FeAPOs, TiAPOs and FCAPOs.

5. A process according to claim 4, wherein said ELAPSOs are selected from the group consisting of CoAPSOs, FeAPSOs, MgAPSOs, MnAPSOs, TiAPSOs, ZnAPSOs, CoMgAPSOs and CoMnMgAPSOs.

6. A process according to claim 1, wherein said catayst contains from about 0.01 to about 10 weight percent platinum.

7. A process according to claim 1, wherein said catalyst contains from about 0.1 to about 3 weight percent platinum.

8. A process according to claim 1, wherein said platinum metal is introduced onto said crystalline material by impregnation.

9. A process according to claim 1, wherein said platinum metal is introduced onto said crystalline material by ion exchange.

10. A process according to claim 1, wherein the partial pressure of molecular chlorine in said stream of gas in step (i) is from about 3 to about 15 Torr.

11. A process according to claim 1, wherein the ratio of the partial pressure of water to the partial pressure of molecular chlorine in said stream of gas of step (i) is less than or equal to 2.

12. A process according to claim 11, wherein said ratio is greater than or equal to 0.01.

13. A process according to claim 12, wherein said ratio is less than or equal to 1.0.

14. A process according to claim 13, wherein said ratio is greater than or equal to 0.1.

15. A process according to claim 1, wherein said catalyst is contacted with said stream of gas in accordance with step (i) at a temperature of from about 150° C. to about 450° C.

16. A process according to claim 1, wherein said reducing of purged catalyst in accordance with step (iii) is carried out at a temperature of from about 140° C. to about 550° C.

17. A process according to claim 1, wherein oxygen is present in said stream of gas used in accordance with step (i).

18. A process according to claim 17, wherein the partial pressure of said oxygen in said stream of gas is from about 50 to about 500 Torr.

19. A process according to claim 17, wherein the partial pressure of said oxygen in said stream of gas is from about 100 to about 400 Torr.

20. A process according to claim 19, wherein the partial pressure of molecular chlorine in said stream of gas in step (i) is from about 8 to about 12 Torr.

* * * * *